US012250344B2

(12) United States Patent
Cornwell et al.

(10) Patent No.: US 12,250,344 B2
(45) Date of Patent: Mar. 11, 2025

(54) CALLER VERIFICATION VIA CARRIER METADATA

(71) Applicant: Pindrop Security, Inc., Atlanta, GA (US)

(72) Inventors: John Cornwell, Atlanta, GA (US); Terry Nelms, II, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

(21) Appl. No.: 18/423,858

(22) Filed: Jan. 26, 2024

(65) Prior Publication Data

US 2024/0171680 A1 May 23, 2024

Related U.S. Application Data

(63) Continuation of application No. 17/948,991, filed on Sep. 20, 2022, now Pat. No. 11,889,024, which is a
(Continued)

(51) Int. Cl.
*H04M 3/00* (2024.01)
*G06F 18/214* (2023.01)
(Continued)

(52) U.S. Cl.
CPC ........ *H04M 3/5175* (2013.01); *G06F 18/214* (2023.01); *H04M 3/2218* (2013.01);
(Continued)

(58) Field of Classification Search
CPC ....... H04M 2203/6027; H04M 3/2218; H04M 3/2281; H04M 15/47; H04M 2203/6045;
(Continued)

(56) References Cited

U.S. PATENT DOCUMENTS 4,521,647 A 6/1985 Olson et al.
5,850,434 A 12/1998 Ardon
(Continued)

FOREIGN PATENT DOCUMENTS

WO WO-2010/025805 A1 3/2010
WO WO-2019/002891 A1 1/2019

OTHER PUBLICATIONS

Extended European Search Report on EPO Appl. 20854174.8 dated Aug. 2, 2023 (8 pages).
(Continued)

*Primary Examiner* — Kharye Pope
(74) *Attorney, Agent, or Firm* — Foley & Lardner LLP

(57) ABSTRACT

Embodiments described herein provide for passive caller verification and/or passive fraud risk assessments for calls to customer call centers. Systems and methods may be used in real time as a call is coming into a call center. An analytics server of an analytics service looks at the purported Caller ID of the call, as well as the unaltered carrier metadata, which the analytics server then uses to generate or retrieve one or more probability scores using one or more lookup tables and/or a machine-learning model. A probability score indicates the likelihood that information derived using the Caller ID information has occurred or should occur given the carrier metadata received with the inbound call. The one or more probability scores be used to generate a risk score for the current call that indicates the probability of the call being valid (e.g., originated from a verified caller or calling device, non-fraudulent).

20 Claims, 6 Drawing Sheets

Related U.S. Application Data continuation of application No. 16/992,789, filed on Aug. 13, 2020, now Pat. No. 11,470,194.

(60) Provisional application No. 62/888,978, filed on Aug. 19, 2019.

(51) Int. Cl.

| | | |
|---|---|---|
| H04L 12/66 | (2006.01) | |
| H04M 3/22 | (2006.01) | |
| H04M 3/42 | (2006.01) | |
| H04M 3/51 | (2006.01) | |
| H04M 5/00 | (2006.01) | |

(52) U.S. Cl.
CPC ..... *H04M 3/2281* (2013.01); *H04M 3/42059* (2013.01); *G06V 2201/10* (2022.01)

(58) Field of Classification Search
CPC .. H04M 3/42059; H04M 3/436; H04M 15/58; H04M 2203/551; H04M 2203/555; H04M 3/2263; H04M 3/367; H04M 3/42357; H04M 7/0078; H04M 3/5235; H04M 15/41; H04M 2203/556; H04M 3/42042; H04M 2203/60; H04M 2215/0148; H04L 63/08; H04L 63/1416; H04L 63/1466; H04L 63/1483; H04L 63/20; H04L 63/1425; G06Q 20/4016; G06Q 20/405; G06Q 20/3674; H04W 12/06; H04W 12/12; H04W 12/02; H04W 12/08; H04W 4/029; H04W 12/122

See application file for complete search history.

(56) References Cited

U.S. PATENT DOCUMENTS

| | | |
|---|---|---|
| 6,208,720 B1 | 3/2001 | Curtis et al. |
| 6,542,588 B1 | 4/2003 | Mashinsky |
| 6,804,331 B1 | 10/2004 | Vacek et al. |
| 6,856,982 B1 | 2/2005 | Stevens et al. |
| 7,027,987 B1 | 4/2006 | Franz et al. |
| 7,039,166 B1 | 5/2006 | Peterson et al. |
| 7,155,417 B1 | 12/2006 | Sagar et al. |
| 7,225,343 B1 | 5/2007 | Honig et al. |
| 7,570,751 B2 | 8/2009 | Betts et al. |
| 7,774,363 B2 | 8/2010 | Lim |
| 8,027,879 B2 | 9/2011 | Ramer et al. |
| 8,102,988 B2 | 1/2012 | Gavillet et al. |
| 8,107,459 B1 | 1/2012 | Croak et al. |
| 8,145,552 B2 | 3/2012 | Blank |
| 8,145,562 B2 | 3/2012 | Wasserblat et al. |
| 8,180,873 B2 | 5/2012 | Bhatt et al. |
| 8,185,930 B2 | 5/2012 | Alperovitch et al. |
| 8,223,921 B2 | 7/2012 | Makarov et al. |
| 8,223,927 B2 | 7/2012 | Di Serio et al. |
| 8,238,532 B1 | 8/2012 | Cox et al. |
| 8,270,588 B2 | 9/2012 | Schwartz |
| 8,364,147 B2 | 1/2013 | Corem et al. |
| 8,401,982 B1 | 3/2013 | Satish et al. |
| 8,509,733 B2 | 8/2013 | Corem et al. |
| 8,510,215 B2 | 8/2013 | Gutierrez et al. |
| 8,583,498 B2 | 11/2013 | Fried et al. |
| 8,666,841 B1 | 3/2014 | Claridge et al. |
| 8,767,948 B1 | 7/2014 | Riahi et al. |
| 8,774,379 B1 | 7/2014 | Youngs et al. |
| 8,793,131 B2 | 7/2014 | Guerra et al. |
| 8,898,293 B2 | 11/2014 | Raleigh et al. |
| 8,930,261 B2 | 1/2015 | Hartig et al. |
| 9,001,985 B2 | 4/2015 | Cox et al. |
| 9,037,113 B2 | 5/2015 | Balasubramaniyan et al. |
| 9,071,683 B1 | 6/2015 | Somes et al. |
| 9,098,852 B1 | 8/2015 | Dangott et al. |
| 9,100,451 B2 | 8/2015 | Enqvist |
| 9,113,001 B2 | 8/2015 | Rajakumar et al. |
| 9,135,630 B2 | 9/2015 | Goldfarb et al. |
| 9,154,640 B2 | 10/2015 | Goldfarb |
| 9,203,856 B2 | 12/2015 | Boggs et al. |
| 9,203,962 B2 | 12/2015 | Guerra et al. |
| 9,232,052 B1 | 1/2016 | Flaks et al. |
| 9,264,539 B2 | 2/2016 | Lin |
| 9,275,211 B2 | 3/2016 | Stubblefield |
| 9,288,320 B2 | 3/2016 | Springer |
| 9,374,464 B1 | 6/2016 | Demsey |
| 9,444,839 B1 | 9/2016 | Faulkner et al. |
| 9,483,742 B1 | 11/2016 | Ahmed |
| 9,485,354 B1 | 11/2016 | Flaks et al. |
| 9,503,571 B2 | 11/2016 | Guerra et al. |
| 9,578,004 B2 | 2/2017 | Greenspan et al. |
| 9,591,136 B1 | 3/2017 | Garcia et al. |
| 9,619,772 B1 | 4/2017 | Adogla et al. |
| 9,680,846 B2 | 6/2017 | Haugsnes |
| 9,699,305 B1 | 7/2017 | Compert et al. |
| 9,699,660 B1 | 7/2017 | Blatt et al. |
| 9,781,255 B1 | 10/2017 | Gailloux et al. |
| 9,883,040 B2 | 1/2018 | Strong et al. |
| 10,033,751 B2 | 7/2018 | Donnelly et al. |
| 10,091,349 B1 | 10/2018 | Rao et al. |
| 10,115,111 B2 | 10/2018 | Miltonberger |
| 10,142,463 B2 | 11/2018 | Douglas |
| 10,225,397 B2 | 3/2019 | Compert et al. |
| 10,236,017 B1 | 3/2019 | Witt-Ehsani et al. |
| 10,289,838 B2 | 5/2019 | Singla et al. |
| 10,303,869 B1 | 5/2019 | Duke et al. |
| 10,366,231 B1 | 7/2019 | Singh et al. |
| 10,389,872 B1 | 8/2019 | Cox et al. |
| 10,397,255 B1 | 8/2019 | Bhalotra et al. |
| 10,477,012 B2 | 11/2019 | Rao et al. |
| 10,542,135 B2 | 1/2020 | Douglas |
| 10,805,340 B1 | 10/2020 | Goradia |
| 10,887,457 B1 | 1/2021 | Degeorgis et al. |
| 10,938,982 B1 | 3/2021 | Merchant et al. |
| 2002/0188712 A1 | 12/2002 | Caslin et al. |
| 2003/0063731 A1 | 4/2003 | Woodring |
| 2003/0147516 A1 | 8/2003 | Lawyer et al. |
| 2004/0044912 A1 | 3/2004 | Connary et al. |
| 2004/0088167 A1 | 5/2004 | Sartini |
| 2005/0278550 A1 | 12/2005 | Mahone et al. |
| 2006/0020459 A1 | 1/2006 | Carter et al. |
| 2006/0248019 A1 | 11/2006 | Rajakumar |
| 2006/0285665 A1 | 12/2006 | Wasserblat et al. |
| 2007/0036314 A1 | 2/2007 | Kloberdans et al. |
| 2007/0116207 A1 | 5/2007 | Brunson |
| 2007/0150773 A1 | 6/2007 | Srivastava |
| 2007/0192240 A1 | 8/2007 | Crooks |
| 2007/0204033 A1 | 8/2007 | Bookbinder et al. |
| 2008/0084975 A1 | 4/2008 | Schwartz |
| 2008/0089503 A1 | 4/2008 | Crockett et al. |
| 2008/0154668 A1 | 6/2008 | Kuo et al. |
| 2008/0195387 A1 | 8/2008 | Zigel et al. |
| 2008/0195540 A1 | 8/2008 | Gee et al. |
| 2008/0219422 A1 | 9/2008 | Polozola et al. |
| 2009/0037172 A1 | 2/2009 | Fodrini et al. |
| 2009/0112586 A1 | 4/2009 | Williams |
| 2009/0207987 A1 | 8/2009 | Ryan |
| 2009/0265328 A1 | 10/2009 | Parekh et al. |
| 2010/0115621 A1 | 5/2010 | Staniford et al. |
| 2010/0145734 A1 | 6/2010 | Becerra et al. |
| 2010/0161591 A1 | 6/2010 | Jones et al. |
| 2010/0174784 A1 | 7/2010 | Levey et al. |
| 2010/0199189 A1 | 8/2010 | Ben-Aroya et al. |
| 2010/0229239 A1 | 9/2010 | Rozenberg et al. |
| 2011/0026702 A1 | 2/2011 | Bot |
| 2011/0206198 A1 | 8/2011 | Freedman et al. |
| 2011/0239295 A1 | 9/2011 | Sorge et al. |
| 2012/0054202 A1 | 3/2012 | Rajakumar |
| 2012/0124192 A1 | 5/2012 | Daoud et al. |
| 2012/0180124 A1 | 7/2012 | Dallas et al. |
| 2012/0253805 A1 | 10/2012 | Rajakumar et al. |
| 2012/0254243 A1 | 10/2012 | Zeppenfeld et al. |
| 2012/0330765 A1 | 12/2012 | Fried et al. |
| 2013/0036069 A1 | 2/2013 | Salloum et al. |
| 2013/0109358 A1 | 5/2013 | Balasubramaniyan et al. |

(56) References Cited

U.S. PATENT DOCUMENTS

| | | |
|---|---|---|
| 2013/0110746 A1 | 5/2013 | Ahn |
| 2013/0139236 A1 | 5/2013 | Rubinstein et al. |
| 2013/0156171 A1 | 6/2013 | Springer |
| 2013/0182835 A1 | 7/2013 | Ma et al. |
| 2014/0045446 A1 | 2/2014 | Assuncao et al. |
| 2014/0045456 A1 | 2/2014 | Ballai et al. |
| 2014/0046850 A1 | 2/2014 | Xiang et al. |
| 2014/0079195 A1 | 3/2014 | Srivastava et al. |
| 2014/0100835 A1 | 4/2014 | Majumdar et al. |
| 2014/0129420 A1 | 5/2014 | Howe |
| 2014/0244476 A1 | 8/2014 | Shvarts et al. |
| 2014/0249873 A1 | 9/2014 | Stephan et al. |
| 2014/0279379 A1 | 9/2014 | Mahdi et al. |
| 2014/0282964 A1 | 9/2014 | Stubblefield |
| 2014/0286484 A1 | 9/2014 | Ehrlich et al. |
| 2014/0295802 A1 | 10/2014 | Rybak et al. |
| 2014/0314225 A1 | 10/2014 | Riahi et al. |
| 2014/0376405 A1 | 12/2014 | Erickson et al. |
| 2014/0376705 A1 | 12/2014 | Layman et al. |
| 2015/0019410 A1 | 1/2015 | Canis et al. |
| 2015/0026786 A1 | 1/2015 | Alexander |
| 2015/0044987 A1 | 2/2015 | Menon et al. |
| 2015/0073987 A1 | 3/2015 | Dutt |
| 2015/0087280 A1 | 3/2015 | Farrand et al. |
| 2015/0113024 A1 | 4/2015 | Howe |
| 2015/0120296 A1 | 4/2015 | Stern et al. |
| 2015/0142623 A1 | 5/2015 | Ferguson et al. |
| 2015/0163121 A1 | 6/2015 | Mahaffey et al. |
| 2015/0181415 A1 | 6/2015 | Raleigh et al. |
| 2015/0193781 A1 | 7/2015 | Dave et al. |
| 2015/0220619 A1 | 8/2015 | Gray et al. |
| 2015/0237068 A1 | 8/2015 | Sandke et al. |
| 2015/0249737 A1 | 9/2015 | Spievak et al. |
| 2015/0257681 A1 | 9/2015 | Shuster et al. |
| 2015/0278709 A1 | 10/2015 | Zeng et al. |
| 2015/0287043 A1 | 10/2015 | Michaelis et al. |
| 2015/0381801 A1 | 12/2015 | Rajakumar et al. |
| 2016/0005049 A1 | 1/2016 | Menezes et al. |
| 2016/0012471 A1 | 1/2016 | Fisher et al. |
| 2016/0027055 A1 | 1/2016 | Dixon et al. |
| 2016/0042446 A1 | 2/2016 | Chandrasekaran et al. |
| 2016/0044056 A1 | 2/2016 | Boggs et al. |
| 2016/0055322 A1 | 2/2016 | Thomas |
| 2016/0078456 A1 | 3/2016 | Chakraborty et al. |
| 2016/0117466 A1 | 4/2016 | Singh |
| 2016/0150414 A1 | 5/2016 | Flaks et al. |
| 2016/0164890 A1 | 6/2016 | Haugsnes |
| 2016/0337403 A1 | 11/2016 | Stoops et al. |
| 2016/0358065 A1 | 12/2016 | Gedge et al. |
| 2016/0379105 A1 | 12/2016 | Moore et al. |
| 2017/0111506 A1 | 4/2017 | Strong et al. |
| 2017/0111515 A1 | 4/2017 | Bandyopadhyay et al. |
| 2017/0133017 A1 | 5/2017 | Rajakumar et al. |
| 2017/0142150 A1 | 5/2017 | Sandke et al. |
| 2017/0149984 A1 | 5/2017 | Flaks et al. |
| 2017/0230390 A1 | 8/2017 | Faulkner et al. |
| 2017/0235466 A1 | 8/2017 | Tanwir et al. |
| 2017/0251261 A1 | 8/2017 | James et al. |
| 2017/0353601 A1 | 12/2017 | Compert et al. |
| 2018/0020021 A1 | 1/2018 | Gilmore et al. |
| 2018/0025157 A1 | 1/2018 | Titonis et al. |
| 2018/0295140 A1 | 10/2018 | Lu et al. |
| 2019/0020757 A1 | 1/2019 | Rao et al. |
| 2019/0026754 A1 | 1/2019 | Miltonberger |
| 2019/0037081 A1 | 1/2019 | Rao et al. |
| 2019/0141183 A1 | 5/2019 | Chandrasekaran et al. |
| 2019/0260801 A1 | 8/2019 | Reddy et al. |
| 2020/0067861 A1 | 2/2020 | Leddy et al. |
| 2020/0322483 A1 | 10/2020 | Anand |

OTHER PUBLICATIONS

"16.6. multiprocessing—Process-based "threading" interface," pp. 1-56, downloaded Nov. 17, 2016, https://docs.python.org/2/library/multiprocessing.html.

"Aggregation", Aggregation—MongoDB Manual 3.2, pp. 1-4, downloaded Nov. 17, 2016,https://docs.mongodb.com/manual/aggregation/.

"Dual-tone multi-frequency signaling", Wikipedia, pp. 1-5, Sep. 30, 2016, https://en.wikipedia.org/wiki/Dual-tone_multi-frequency_signaling.

"Write Concern" Write Concern-MongoDB Manual 3.2, pp. 1-3, downloaded Nov. 17, 2016, https://docs.mongodb.com/manual/reference/write-concern/.

Australian Examination Report, dated Oct. 19, 2018, issued in corresponding Australian Application No. 2016338689, 8 pages.

Australian Office Action issued in Application No. 2016338689, dated May 26, 2018.

Canadian Office Action dated Mar. 27, 2019, issued in corresponding Canadian Application No. 3,032,817, 4 pages.

Communication pursuant to Article 94(3) EPC issued in Application No. 17 752 229.9-1213 dated Dec. 6, 2019.

Communication pursuant to Article 94(3) EPC on EP 17752229.9 dated Dec. 6, 2019.

Examination Report issued in Application No. 16 790 793.0-1218 dated Feb. 13, 2020.

Extended European Search Report issued in EP Application No. 19156046.5-1218 dated May 10, 2019.

Fourth Office Action issued in Application No. 2016338689, dated May 9, 2019.

International Search Report and Written Opinion for corresponding application PCT/US2017/045090 dated Nov. 3, 2017.

International Search Report and Written Opinion issued in corresponding International Application No. PCT/US2020/46655 with Date of mailing Nov. 18, 2020.

International Search Report issued in International Application No. PCT/US2016/057154 with Date of mailing Jan. 23, 2017.

International Search Report issued in International Application No. PCT/US2017/045506, with Date of mailing Oct. 13, 2017.

Non-Final Office Action for U.S. Appl. No. 16/992,789 dated Aug. 4, 2021 (12 pages).

Non-Final Office Action for U.S. Appl. No. 16/992,789 dated Feb. 7, 2022 (13 pages).

Notice of Allowance on U.S. Appl. No. 16/992,789 dated Jun. 7, 2022 (8 pages).

Notification of Transmittal of The International Preliminary Report on Patentability issued in International Application No. PCT/US2016/057154 with Date of mailing Jan. 23, 2018.

Notification of Transmittal of The International Preliminary Report on Patentability issued in International Application No. PCT/US2017/045090 dated Oct. 18, 2018.

Notification of Transmittal of the International Preliminary Report on Patentability issued in International Application No. PCT/US2017/045506 with Date of mailing Oct. 30, 2018.

Notification of Transmittal of the International Preliminary Report on Patentability, mailed Oct. 30, 2018, in corresponding International Application No. PCT/US2017/045506, 15 pages.

Schulzrinne, H., et al., "RTP Payload for DTMF Digits, Telephone Tones and Telephony Signals," #2833, May 2000, pp. 1-28, Https://www.ietf.org/rfc/rfc2833.txt.

Schulzrinne, H., et al., "RTP Payload for DTMF Digits, Telephony Tones, and Telephony Signals", #4733, Dec. 2006, pp. 1-50, https://tools.ietf.org/html/rfc4733.

Second Australian Office Action issued in Application No. 2016338689, dated Oct. 19, 2018.

Third Australian Office Action issued in Application No. 2016338689, dated Mar. 2, 2019.

Written Opinion of the International Preliminary Examining Authority, mailed Jun. 21, 2018, issued in corresponding International Application No. PCT/US2017/045090, 5 pages.

First Examiner's Report on CA App. 3,148,829 dated Feb. 20, 2023 (3 pages).

International Preliminary Report on Patentability for PCT App. PCT/US2020/046655 dated Feb. 17, 2022 (7 pages).

(56) References Cited

OTHER PUBLICATIONS

Examination report on Australia Appl. Ser. No. 2020333678 dated Nov. 16, 2022 (4 pages).
Examination Report Office Action on European Application No. 20854174.8-1206 dated Oct. 10, 2024 (5 Pages).

|        | Switch 1 | Switch 2 | . . . |
|--------|----------|----------|-------|
| NY     | 70%      | 10%      | . . . |
| NJ     | 30%      | 75%      | . . . |
| CT     | 0%       | 5%       | . . . |
| . . .  | . . .    | . . .    | . . . |

Carrier Metadata (Switch) 202 (columns)
Derived Metadata (US States) 203 (rows)

Table A 201: Switch → US State

FIG. 2A

|           | JIP 404-555 | JIP 631-423 | . . . |
|-----------|-------------|-------------|-------|
| Carrier A | 80%         | 20%         | . . . |
| Carrier B | 20%         | 55%         | . . . |
| Carrier C | 0%          | 2%          | . . . |
| . . .     |             |             |       |

Carrier Metadata (JIP) 206 (columns)
Derived Metadata (Carrier) 207 (rows)

Table B 205: JIP → Carrier

FIG. 2B

CALLER VERIFICATION VIA CARRIER METADATA

CROSS-REFERENCE TO RELATED APPLICATIONS

This application is a continuation of U.S. patent application Ser. No. 17/948,991, filed Sep. 20, 2022, which is a continuation of U.S. patent application Ser. No. 16/992,789, filed Aug. 13, 2020, which claims priority to U.S. Provisional Application No. 62/888,978, filed Aug. 19, 2019, each of which is incorporated by reference in its entirety.

This application is related to U.S. patent application Ser. No. 15/294,576, entitled "Call Detail Record Analysis to Identify Fraudulent Activity," filed Oct. 14, 2016; U.S. patent application Ser. No. 15/294,538, entitled "Fraud Detection in Interactive Voice Response Systems," filed Oct. 14, 2016; and U.S. patent application Ser. No. 15/666,917, entitled "Method and Apparatus for Threat Identification Through Analysis of Communications Signaling, Events, and Participants" filed Aug. 2, 2017, all of which are incorporated by reference in their entirety.

TECHNICAL FIELD

This application generally relates to systems and methods for intelligent, automated detection of fraudulent or spoofed telephone calls and automated generation of models for such detection processes.

BACKGROUND

There is an ever present threat of fraud over the telephone network. Caller identifier ("Caller ID") data, for example, was originally designed to provide convenience for honest or registered users. However, spoofing a Caller ID has become an ideal tool for criminals or other bad actors to abuse the Caller ID features for fraudulent or other malicious purposes. It would be beneficial to develop anti-fraud or call verification processes that are not susceptible to spoofed or manipulated data associated with phone calls.

There have been prior attempts to address this problem. For example, some solutions use a "signing" process that implements call verification "keys." This solution however, has significant overhead and can be overly complicated for end-consumers in the public. It would be preferable to implement solutions that do not require cryptographic mechanisms such as implementing encryption or verification keys.

Other solutions have examined the state of an inbound call for a line is "busy." When an inbound call is received, the system will make a reciprocal outbound call to determine whether the line is busy. This solution requires overhead and may not always be available. In addition, it may not provide more robust features, such as tracking known fraudulent behavior or known verified callers. And even if a call is busy, there is no guarantee that the call is not otherwise fraudulent. It would be beneficial to gather more information about calls to determine whether a call is fraudulent or verified, and capture and analyze various types of data associated with calls to perform additional or alternative features.

SUMMARY

What is therefore needed are systems and methods for call verification or risk detection for calls made to call centers using signaling data associated with the calls, where the determinations do not require cryptography techniques or outbound calls from a call center or fraud analysis system to a calling device. Disclosed herein are systems and methods capable of addressing the above described shortcomings and may also provide any number of additional or alternative benefits and advantages. Embodiments described herein provide for passive caller verification and/or passive fraud risk assessments for current, inbound calls to customer call centers. An illustrative system disclosed herein may be used in real time as a call is coming into a call center. An analytics server of an analytics service looks at the purported Caller ID of the call, as well as the unaltered carrier metadata, which the analytics server then uses to generate or retrieve one or more probability scores using one or more lookup tables and/or a machine-learning model. A probability score indicates the likelihood that information derived using the Caller ID information has occurred or should occur given the carrier metadata received with the inbound call. The one or more probability scores be used to generate a risk score for the current call that indicates the probability of the call being valid (e.g., originated from a verified caller or verified calling device or non-fraudulent).

In an embodiment, a computer-implemented method for caller verification, in which the method comprises receiving, by a computer, carrier metadata for a current call originated at a calling device; receiving, by the computer from an analytics database, probability data for derived metadata based upon the carrier metadata, wherein the probability data indicates a probability of occurrence of values of derived metadata with respect to values in carrier metadata; generating, by the computer, one or more probability scores based upon the probability data, the values of the derived metadata, and the values of the carrier metadata; and generating, by the computer, a risk score for the current call based upon the one or more probability scores associated with the current call.

In another embodiment, system comprises an analytics database comprising a non-transitory storage medium configured to store probability data for derived metadata, wherein the probability data indicates a probability of occurrence of values of derived metadata with respect to values in carrier metadata; and a server comprising a processor configured to: receive carrier metadata for a current call originated at a calling device; receive, from the analytics database, probability data for the derived metadata based upon the carrier metadata; generate one or more probability scores based upon the probability data, the values of the derived metadata, and the values of the carrier metadata; and generate a risk score for the current call based upon the one or more probability scores associated with the current call.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 2A shows an illustrative probability lookup table generated by a computing device according to an embodiment.

FIG. 2B shows an illustrative probability lookup table generated by a computing device according to an embodiment.

DETAILED DESCRIPTION

Figure 1:
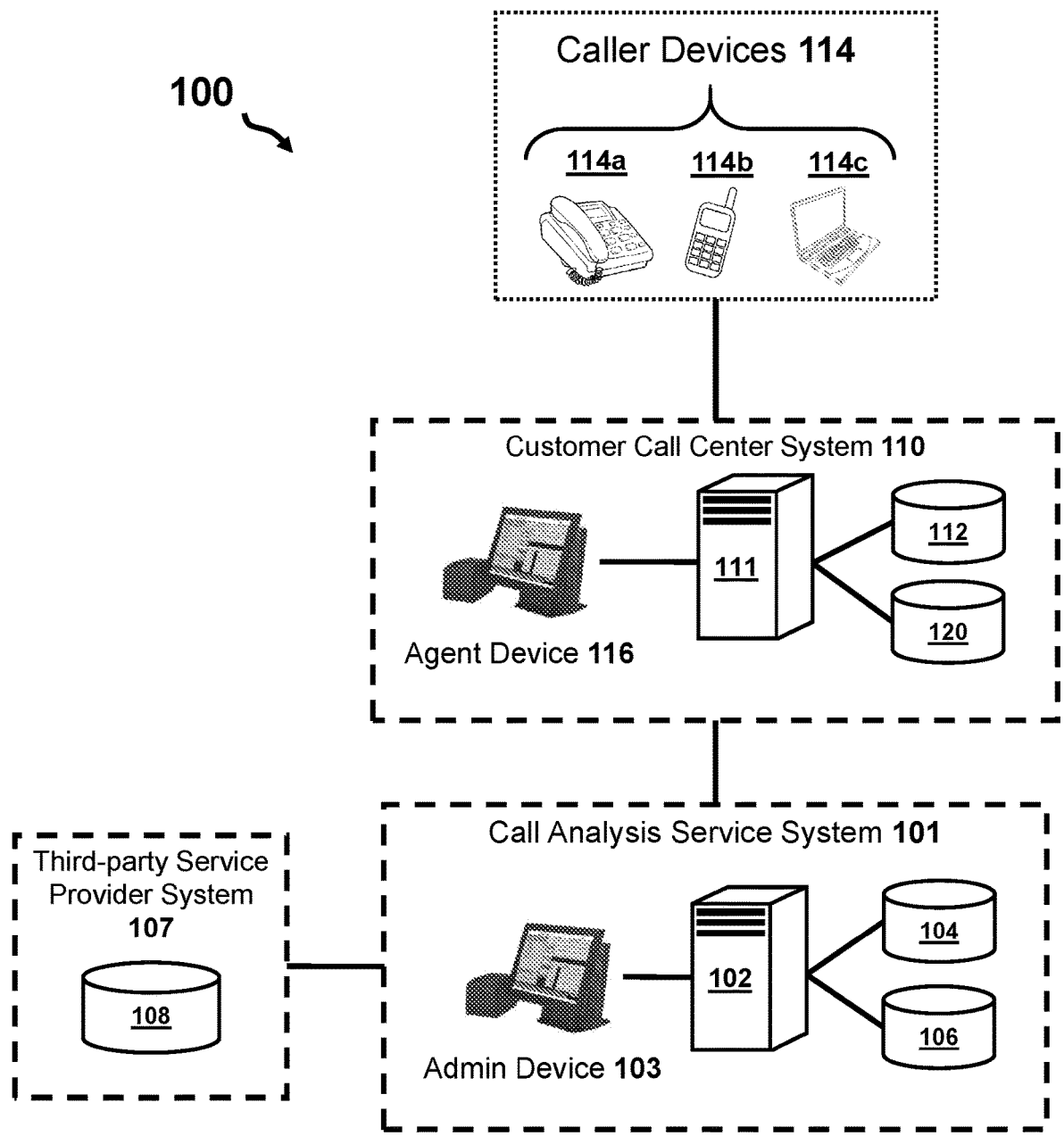
FIG. 1 illustrates a system for detecting spoofed audio signals, according to an illustrative embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The call data behind a telephone call can be generally characterized as comprising two components: media (also called "media data") and signaling data. The media data contains the actual call audio, including data needed to reproduce voices or sounds at the other end of the telephone call. The signaling data contains information about the call, such as call routing information, a Caller ID, call destination information, and the like. In other words, the signaling data contains information required to connect the call, from one end to another. Embodiments described herein are generally directed to caller verification or detecting fraud based on the signaling information.

Caller ID is a type of metadata received with the signaling data that is typically easy to alter. A spoofed call is a call where the Caller ID is altered to deceive the recipient (sometimes referred to as a "callee" or "destination"), often for fraudulent purposes. Spoofed calls are frequently made to companies that handle personal or financial information, such as banks, credit card companies, and retail stores, and that often reference the Caller ID for, at least in part, caller verification. A spoofed Caller ID is therefore used to mask an identity, or assume the identity of a legitimate consumer-caller. However, there is signaling information in a call that is much harder to alter. The embodiments described herein use the more assured signaling information to detect spoofed calls.

Caller ID spoofing techniques typically only alter the Caller ID of a call, leaving other fields in the carrier metadata unchanged. The particular values of these metadata fields are correlated to certain carriers, geographic locations, and line types (e.g., VOIP, landline, cellular). Certain metadata fields, such as carrier, geographic location, and line type, can be inferred from the Caller ID (sometimes referred to as "Caller ID derived information"), and the correlations to carrier metadata values can be calculated by analyzing a large number of calls. A common field that may be used for this purpose is the SS7 JIP (RFC 4694). The values of this field may have a strong correlation to geographic location (which can be inferred from Caller ID), but also carrier and line type as well. Other custom fields are often implemented by carriers for internal use in their network and can be used in the same way as JIP. To create useful probability lookup tables and/or machine-learning models, a large volume of production call traffic may be desired, on the order of tens of thousands to millions of calls. These tables and/or machine-learning models are generated or trained by associating the calls into groups based on the carrier metadata, with the Caller ID-derived information broken down by percentage or other correlations.

Systems and methods herein may provide for passive caller verification and/or passive fraud risk assessments for current, inbound calls to customer call centers. An illustrative system disclosed herein may be used in real time as a call is coming into a call center. An analytics server of an analytics service looks at the purported Caller ID of the call, as well as the unaltered carrier metadata, which the analytics server then uses to generate or retrieve one or more probability scores using one or more lookup tables and/or a machine-learning model. A probability score indicates the likelihood that information derived using the Caller ID information has occurred or should occur given the carrier metadata received with the inbound call. The one or more probability scores be used to generate a risk score for the current call that indicates the probability of the call being valid (e.g., originated from a verified caller or calling device, non-fraudulent). In some cases, calls with a high likelihood of being valid proceed through the call center with a heightened level of authentication and permitted to access sensitive information or features. Additionally or attentively, the carrier metadata can be used to directly determine whether the call is valid, if the carrier metadata is associated with known fraudulent behavior or registered caller or calling device information. The signaling information used for embodiments herein may include any form of data that can be correlated against one or more pieces of data derived using a Caller ID, automatic number identification (ANI), or other types of data received with carrier metadata. Embodiments may be deployed for various applications and use cases. For example, the verification or anti-fraud processes may be used as a standalone process; a verification or anti-fraud process paired with ANI-on-file information stored in one or more databases; a verification or anti-fraud system paired with other indicators of fraud; and/or a verification or anti-fraud system paired with other caller identification engines (e.g., active verification, active fraud determination).

A. Components of an Illustrative System

FIG. 1 shows components of a system 100 for receiving and analyzing telephone calls, according to an illustrative embodiment. The illustrative system 100 comprises analytics servers 102, call records databases 104, analytics databases 106, telephony databases 108, customer call center systems 110 of customer enterprises (e.g., companies, government entities), and caller devices 114.

Embodiments may comprise additional or alternative components or omit certain components from what is shown in FIG. 1, yet still fall within the scope of this disclosure. For ease of description, FIG. 1 shows only one instance of various aspects the illustrative embodiment. However, other embodiments may comprise any number of the components. For instance, it will be common for there to be multiple call center systems 110, or for an analytics system 101 to have multiple analytics servers 102. Although FIG. 1 shows the illustrative system 100 having only a few of the various components, embodiments may include or otherwise implement any number of devices capable of performing the various features and tasks described herein. For example, in the illustrative system 100, an analytics server 102 is shown as a distinct computing device from an analytics database 106; but in some embodiments the analytics database 106 may be integrated into the analytics server 102, such that these features are integrated within a single device.

The illustrative system 100 of FIG. 1 comprises various network infrastructures 101, 107, 110, including a call analytics system 101, a third-party telephony service provider system 107 and customer call centers 110. The network infrastructures 101, 107, 110 may be a physically and/or logically related collection of devices owned or managed by some enterprise organization, where the devices of each infrastructure 101, 107, 110 are configured to provide the intended services of the particular infrastructure 101, 107, 110 and responsible organization.

A call analytics system 101 is operated by a call analytics service that provides various call management, security, authentication, and analysis services to customer organizations (e.g., corporate call centers, government entities). Callers can place telephone calls to call centers 110 of various organizations. When caller devices 114 originate telephone calls, call data for the telephone calls are generated by components of telephony networks and carrier systems, such as switches and trunks, as well as caller devices 114. The call data can be forwarded to, or otherwise received by, the call analytics system 101. Components of the analytics service 101, such as an analytics server 102, execute various processes based upon the call data in order to provide call analytics services to organizations that are customers of the call analytics service.

A third-party telephony service system 107 is operated by a third-party organization offering telephony services to organizations such as the call analytics system 101. In the illustrative system 100, the third-party telephony service is a separate company from the call analytics service, though it is not required; the third-party service may be a separate company or a sibling entity of a common parent entity. In some embodiments, there may not be a third-party, but rather the call analytics system 101 may comprise the hardware and software components of the third-party telephony service system 107 described herein. The third-party telephony services may provide high-level telecommunications or network governance and planning services, such as authoritative directory services, DNS services, ANI governance or registries, Caller ID governance or registries, and the like. As shown in FIG. 1, the third-party system 107 comprises a telephony database 108 that stores information about, for example, calling devices 114, ANIs, and Caller IDs, among other information about telecommunications systems and devices. The call analytics system 101 may query the telephony database 108 according to purported information received with or derived from metadata received from calling devices 114 during telephone calls, such as an ANI or Caller ID received with a current call. The information retrieved from the telephony database 108 may be, for example, various information known to be (by registration) or otherwise frequently associated with the Caller ID or ANI.

Customer call center systems 110 are owned and operated by organizations (e.g., corporations, government entities) that are customers of the call analytics service. Call center systems 110 may receive telephone calls from callers who are consumers or users of services offered by customer organizations. Call data received with phone calls may be captured by devices of call center systems 110 and forwarded to the call analytics system 101 via one or more networks. For instance, a customer may be a bank that operates a call center system 110 to handle calls from consumers regarding accounts and product offerings. As a customer of the call analytics service, the bank's call center system 110 forwards captured call data to the call analytics system 101, which may determine risk scores of calls on behalf of the bank.

The various components of the system 100 may be interconnected with each other through hardware and software components of one or more public or private networks. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, caller devices 114 may communicate with callee-destinations (e.g., customer call centers 110) via telephony and telecommunications protocols, hardware, and software capable of hosting, transporting, and exchanging telephony-based call data (e.g., media data, signaling data) associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as, for example, carriers, exchanges, and networks, among others.

In the illustrative system 100 of FIG. 1, a call analytics system 101 comprises an analytics server 102, an admin device 103, a call records database 104, and an analytics database 106. The call analytics server 102 may receive call data from the records database 104 and various data structures (e.g., probability tables, metadata weights, feature vectors, trained machine-learning models) used for executing anti-fraud or anti-spoofing processes. The analytics server 102 may also query or otherwise receive certain types of data from a telephony database 108, which may be operated by a third-party service and may contain data about, for example, caller devices 114, carriers, callers, and other types of information.

An analytics server 102 of the analytics system 101 may generate and store probability data in an analytics database 106 using call data (e.g., signaling data) of past and/or current inbound calls, as received from, for example, customer call center systems 110, third-party telephony service systems 107, and/or other telecommunications systems. The analytics server 102 may use this probability data to generate a risk score for a current inbound call 110, and in turn determine whether the risk score satisfies a threshold value, which may be a call verification value or a threat risk threshold.

The analytics server 102 may be any computing device comprising one or more processors and software, and capable of performing the various processes and tasks described herein. The analytics server 102 may be in network-communication with databases 104, 106, 108, and may receive call data from one or more customer call centers 110, and a third-party service system 107. Although FIG. 1 shows a single analytics server 102, it should be appreciated that, in some embodiments, the analytics server 102 may include any number of computing devices. In some cases, the computing devices of the analytics server 102 may perform all or sub-parts of the processes and benefits of the analytics server 102. It should also be appreciated that, in some embodiments, the analytics server 102 may comprise any number of computing devices operating in a cloud computing or virtual machine configuration. It should also be appreciated that, in some embodiments, functions of the analytics server 102 may be partly or entirely performed by computing devices of a customer call center 110 (e.g., customer server 111).

In operation, the analytics server 102 may execute various software-based processes that, for example, ingest call data of telephone calls, query one or more databases 104, 106, 108, generate probability data based on prior call data of prior calls, and determine a risk score of a current inbound call to a call center 110 using the probability data. For each current inbound call, the analytics server 102 may execute caller verification or fraud detection processes using signaling data (e.g., carrier metadata, derived metadata) of the current call and the probability data (e.g., probability lookup tables, machine-learning models, feature vectors) stored in the analytics database 106. The call analytics server 102 generates a risk score for the current inbound call, and determines whether the risk scores satisfies a threshold value, which may be a threat risk threshold or a call verification threshold. A call records database 104 and/or analytics database 106 may store current and prior call data and/or labels that the analytics server 102 may use to generate the probability data, which the analytics server 102 uses to generate the risk score. For threat risk assessment implementations, the probability data indicates to the analytics server 102 the probability that the values of various signaling data fields have occurred or should occur for inbound calls. For call verification implementations, the probability data may indicate to the analytics server 102 the probability that the values of various signaling data fields of the current inbound call match, within the verification threshold, prior or expected calls of registered or otherwise known callers or calling devices 114. Registered call data and/or the probability data associated with registered callers or calling devices 114 may be stored in an analytics database 106 and/or third-party telephony database 108. The analytics server 102 may reference the registered call data to determine the likelihood that an inbound call originated from a registered calling device 114 or caller.

For ease of description, the embodiments described herein refer to generating a risk score and determining the likelihood that an inbound call is fraudulent or not-fraudulent. But it should be appreciated that embodiments are not limited as such. For example, the risk score may be also be a verification score or authentication score that is compared to a verification threshold, rather than a fraud risk threshold. As another example, labels may indicate whether values of certain signaling data fields of prior or current calls, were or are associated with fraudulent or non-fraudulent calls, but labels may additionally or alternatively indicate whether values of signaling data fields of prior or current calls, were or are associated with verified calling devices 114.

Probability data may include information used by the analytics server 102 to determine risk scores for current phones calls made to a call center 110. The probability data may be in the form of, for example, a probability lookup table, a feature vector, or a trained machine-learning model. Using probability data associated with particular types of data fields, the analytics server 102 may determine one or more probability scores according to the values of the particular data fields in a current call. A probability score determined by the analytics server 102 indicates the likelihood that the values of data fields have or should occur together. The probability score may, for example, indicate whether particular pairings or groupings of metadata values are expected to found together in call data. Based upon the one or more probability scores, the analytics server 102 may then determine the risk score of the current call. The analytics server 102 uses prior call data stored in a call records database 104 to generate or update the probability data (e.g., lookup tables, machine-learning models, feature vectors), and stores the probability data into an analytics database 106.

As mentioned, call data may include media data and signaling data. Signaling data may be in the form of, for example, carrier metadata or derived metadata. "Carrier metadata" includes data received with a phone call, such as the data generated by and according to the hardware and protocols of telecommunications carrier systems and networks. Non-limiting examples of carrier metadata fields received with a telephone call may include: originating switch, originating trunk, Jurisdiction Information Parameter (JIP), Originating Line Information (OLI), a P-Asserted-Identity value, and Caller ID, among others.

"Derived metadata" may be data fields having values that are derived, calculated, inferred, or otherwise determined by the analytics server 102 or other device using values of the carrier metadata. Non-limiting examples of derived metadata may include: a carrier, a geographic location, and line type (e.g., cellular, landline, VOIP). For example, the analytics server 102 may use a Caller ID or other types of carrier metadata of a telephone call to determine the carrier or geographic location originating the telephone call. As mentioned, probability data generated by the analytics server 102 may be based upon and otherwise indicate correlations to carrier metadata values to derived metadata values by analyzing a large number of telephone calls. Purported information and purported metadata may refer to the Caller ID and metadata fields derived from Caller ID, as discussed below. Caller ID received with an inbound call and the derived metadata may be considered "purported" because a Caller ID can be spoofed and also because the resulting data or values of derived metadata (derived using the Caller ID) could be spoofed or inaccurate. By contrast, the data or values of other carrier metadata fields cannot be spoofed.

The analytics server 102 may generate derived metadata fields using certain carrier metadata fields or metadata otherwise received with a telephone call. For example, in some implementations, the analytics server 102 may query a telephony database 108 using the value of the Caller ID to retrieve certain derived metadata fields (e.g., line type, carrier, location). In some implementations, derived Caller ID metadata may be stored or cached into a call records database 104 or analytics database 106 for quicker access by the analytics server 102.

In some embodiments, the probability data may include probability lookup tables. The analytics server 102 may use derived metadata, as generated by the analytics server 102 or retrieved from a telephony database 108, to generate probability lookup tables based upon correlations with carrier metadata in a call records database 104 or a current call. The derived metadata may be generated or otherwise referenced to determine the likelihood that a current telephone call is fraudulent or spoofed. Additionally or alternatively, in some embodiments the probability data generated by the analytics server 102 may include trained machine-learning models and/or feature vectors for particular Caller IDs, ANIs, or other identifiers associated with potential calling devices 114. In such cases, the analytics server 102 may generate probability values (e.g., probability scores described above in probability lookup tables) as features fed into a machine learning model.

The analytics server 102 may generate or update probability data at, for example, a certain time interval, in response to a one or more triggering events, in real-time as data or calls are received, or any combination of these options. As an example, the analytics server 102 may automatically generate or update probability data (e.g., lookup tables, feature vectors, trained machine-learning models) at any interval, such as, for example, every day, week, month, or year. As another example, the analytics server 102 may automatically generate or update probability data (e.g., lookup tables, feature vectors, trained machine-learning models) in response to a triggering event, such as, for example, an instruction of a user (e.g., administrative user, agent of a call center system 110), or identifying a new fraudulent telephone call, among others. As another example, the analytics server 102 may automatically generate or update probability data (e.g., lookup tables, feature vectors, trained machine-learning models) in real-time when a call is received or at some other time point during the lifecycle of a current call. In the illustrative system 100, the analytics server 102 may store new or updated probability data into an analytics database 106, though the probability data may be stored on any computing device.

In some embodiments, carrier metadata may be used to detect fraud directly, based upon positive fraud labels associated with certain call records. In such embodiments, calls may be labeled as fraudulent by admin users of the call analytics system 101 or agent users of customer call centers 110 using graphical user interfaces (GUIs) of client computing devices (e.g., admin device 103, agent device 116). The analytics server 102 may receive and store the call data and the fraud label associated with the fraudulent call into an analytics database 106 or call records database 104. The analytics server 102 may identify such labels to automatically determine that a particular Caller ID or ANI of a current call as being fraudulent or to adjust the risk score to make it more or less likely the analytics server 102 will determine the call is fraudulent. Additionally or alternatively, using an admin device 103, an administrative user can execute known fraud methods (e.g., spoofing software services, ANI-masking software services) to simulate fraudulent calls targeting a call center 110 and related metadata, and generate labeled fraud call data. In some implementations, a probability lookup table may directly map carrier metadata to fraud likelihood percentages, in addition or as an alternative to lookup tables containing probabilities based on correlations with derived Caller ID metadata.

For embodiments in which the analytics server 102 executes machine-learning algorithms, the analytics server 102 uses labeled data stored in the analytics database 106 or call records database 104 in order to train or otherwise generate machine-learning models. Labeled data may indicate which call data are associated with fraudulent calls and which are associated with non-fraudulent calls. The analytics server 102 may reference such labels when training machine-learning models.

In some implementations, the analytics server 102 may take certain actions based upon the calculated risk score. For example, if the risk score satisfies a certain risk threshold, the analytics server may determine that the current call is a fraudulent. The analytics server 102 may, for example, generate a notification for display on a graphical user interface (GUI) of a computing device of an agent at a customer call center 110. The analytics server 102 may also end or reject the call, store the metadata for the call into one or more databases 104, 106, 108, or forward the call to a fraud analyst for various remedial measures.

An admin device 103 of the call analytics system 101 is a computing device allowing personnel of the analytics system 101 to perform various administrative tasks or user-executed call analytics operations. The admin device 103 may be any computing device comprising a processor and software, and capable of performing the various tasks and processes described herein. Non-limiting examples of an admin device 103 may include a server, personal computer, laptop computer, tablet computer, or the like. In operation, the admin device 103 is employed by a user to configure operations of various components in the system 100, such as an analytics server 102 or data appliance 120, and may further allow users to issue queries and instructions to various components of the system 100. For example, the admin device 103 may be used to label call data as being associated with fraudulent calls or non-fraudulent calls, and store such labeled call data into a call record database 104 or analytics database 106.

The admin device 103 may also be used to input a threshold (e.g., threat risk threshold, verification threshold) to the analytics server 102 or an analytics database 106 for determining risk scores. In some cases, the threshold values may be global for all calling devices 114 to all customer call systems 110. In some cases, the admin device 103 may be used to tailor threshold values for a particular customer call system 110. The threshold values may also be tailored for certain purposes; for example, the admin device 103 may establish a stricter verification threshold requirement compared to a threat risk threshold. In addition, the analytics server 102 may determine risk scores as different parts of a call lifecycle, which may have increasing strictness. For example, the analytics server 102 executes a fraud risk assessment process using a risk threshold when an inbound call is received by a call center system 110 to initially determine the likelihood the call is not fraudulent. Later in the call, when the caller or calling device 114 attempts to access sensitive information (e.g., personal account information), the analytics server 102 executes call verification process using a comparatively stricter verification threshold.

A call records database 104 of the analytics system 101 may receive and store call data, as received by the call analytics system 101 from various sources, which may include customer call centers 110 and, in some cases, a telecommunications carrier or network device. The call records database 104 may be hosted on any computing device comprising one or more processors and software, and capable of performing the various processes and tasks described herein. As shown in FIG. 1, the call records database 104 may be hosted on a single computing device, but it should be appreciated that the call records database 104 may be hosted on any number of computing devices.

In operation, the call records database 104 may store call data (e.g., carrier metadata, derived metadata, call audio samples) for prior calls and current calls. The call records database 104 can be queried by an analytics server 102 or other devices of the system 100 when performing various tasks, such as generating or updating probability data, determining a risk score, or other operations requiring information about calling devices 114. Generally, when a caller places a telephone call to a customer call center 110, a caller device 114 instructs components of a telecommunication carrier system or network to originate and connect the current telephone call to the customer call center 110. A telecommunications carrier associated with the caller device 114, and in some cases the caller device 114 itself, generates various forms of call data (e.g., signaling data) an analytics server 102 uses when calculating fraud risk scores or generating probability data (e.g., probability lookup tables, trained machine-learning models, feature vectors). The call data may be received by computing devices of the customer call center 110 and forwarded to the call analytics system 101, where such call data is stored into the call database 104.

As mentioned, the call data may comprise carrier metadata generated by computing devices of telecommunications systems and networks, such as switches and trunks. The call data may be stored into the call database 104 for later retrieval and analysis. In some implementations, an analytics server 102 may use the carrier metadata to generate the values of derived metadata when an incoming call is received, and store such derived metadata into the call database 104 or other database (e.g., analytics database 106). And in some implementations, the analytics server 102 may generate derived metadata as part of the process for generating probability data, or as part of the process for generating a risk score.

An analytics database 106 may store various types of probability data generated by the analytics server 102 using call data for prior or current calls. The analytics database may be hosted on any computing device comprising one or more processors and software, and capable of performing various processes and tasks described herein. The analytics database 106 is in network communication with an analytics server 102, and may receive various forms of probability data generated or updated by the analytics server 102 via one or more networks of the call analytics system 101. As shown in FIG. 1, the analytics database 106 is hosted on a single computing device, but it should be appreciated that the analytics database 106 may be hosted on any number of computing devices. The probability data may comprise various data structures generated by the analytics server 102 using call data from various sources. The probability data may include, for example, probability lookup tables, feature vectors, and trained machine-learning models, among other forms of data structures and algorithms.

When determining a risk score for an incoming call is received at a call center 110, the analytics server 102 may retrieve probability data according to certain metadata values received with the incoming call. The analytics server 102 then executes processes for determining the risk score for the call using the retrieved probability data.

As shown in FIG. 1, a third-party telephony service system 107 comprises a telephony database 108 that stores information about, for example, calling devices 114, ANIs, and Caller IDs, among other information about telecommunications systems and devices. The call analytics system 101 may query the telephony database 108 according to purported information received from calling devices 114 during telephone calls, such as an ANI or Caller ID received with a current call. The information retrieved from the telephony database 108 may be, for example, various information known to be (by registration) or otherwise frequently associated with the Caller ID or ANI.

A telephony database 108 may receive and store call data for telephone calls. The data records of the telephony database 108 may include call data received from one or more sources, such as the call analytics system 101, a customer call center 110, and/or various telecommunications networks or carriers. The telephony database 108 may be hosted on any computing device comprising one or more processors and software, and capable of performing the various processes and tasks described herein. As shown in FIG. 1, the telephony database 108 may be hosted on a single computing device, but it should be appreciated that the telephony database 108 may be hosted on any number of computing devices. In addition, as shown in FIG. 1, the telephony database 108 is operated and managed by a third-party telephony service that receives certain call data from one or more telecommunications services, systems, and networks of the system 100. But in some embodiments, the telephony database 108 may be operated and managed by a particular telecommunications network or system; and in some embodiments, the telephony database 108 may be part of the call analytics system 101.

A third-party telephony service hosting the telephony database 108 is a company or other entity offering an administrative or overhead service of the nationwide or global telecommunications system. The third-party telephony service may provide a directory or telecommunications data management service that hosts telephony database 108 storing data of a variety types associated with any number of entities or people. The analytics service 101 may leverage the third-party telephony service as a "source of truth" or tool for validating or cross-referencing various metadata received with calls. The telephony database 108 may store data records mapping certain carrier metadata fields to certain derived metadata fields. For instance, the database records may store data indicating the translation of Caller ID or ANI (e.g., phone number) fields to, for example, a geographic location, an operating carrier, and a line type. When determining a risk score or updating probability data, the analytics server 102 may query the telephony database 108 according to, for example, a Caller ID or the ANI associated with prior calls or a current call.

In some implementations, the analytics system 101 may comprise an additional or alternative telephony database 108. For example, the analytics service 101 may host a telephony database 108, or other database (e.g., records database 104, analytics database 106), configured to store cached metadata associated with Caller IDs or ANIs that are frequently observed by the analytics service 101.

Caller devices 114 may be any communications or computing device that callers can operate to place a telephone call to a callee-destination (e.g., call centers 110) via one or more telecommunications networks. Non-limiting examples of caller devices 114 may include landline phones 114*a* or mobile phones 114*b*. It should be appreciated that caller devices 114 are not limited to telecommunications-oriented devices (e.g., telephones). As an example, a caller device 114 may include an electronic device comprising a processor and/or software, such as a computer 114*c* or IoT device, configured to implement voice-over-IP (VOIP) telecommunications. As another example, a caller device may include an electronic device comprising a processor and/or software, such as an IoT device (e.g., voice assistant device, "smart device"), capable of utilizing telecommunications features of a paired or otherwise internetworked caller device, such as mobile phone 114*b*. A caller device 114 may comprise hardware (e.g., microphone) and/or software (e.g., codec) for detecting and converting sound (e.g., caller's spoken utterance, ambient noise) into electrical audio signals. The caller device 114 then transmits the audio signal according to one or more telephony or other communications protocols to a callee for an established telephone call.

In operation, when a caller device 114 places a telephone call to a call center 110, the caller device 110 may request a telecommunications network or carrier to originate and connect a telephone call to the call center 110. The various components (e.g., switches, trunks, exchanges) of the telecommunications networks and carriers, and in some cases the caller device 114, may generate various forms of call data, which can be stored in a records database 104, and in some cases into a telephony database 108. When the telephone call is established between the caller device 114 and call center 110, a computing device of the call center 110, such as a customer server 111, call center agent device 116, or data appliance 120, forwards the call data to the analytics system 101 via one or more computing networks. The call data for the current, inbound telephone call may be received at device of the analytics system 101 (e.g., analytics server 102) and stored into an analytics database 106. The call data may comprise derived metadata that is based on data generated by or received from components of telecommunications networks and system. For example, the derived metadata may be fields whose values are calculated, queried, inferred, or otherwise determined using values received along with the carrier metadata, such as a Caller ID. The derived metadata fields may include, for example, a geographic location (e.g., Number Planning Area (NPA), state, city), a carrier associated with the telephone call and/or calling device 114, and a line type (e.g., landline, cellular, VoIP).

As mentioned, the call data of a telephone call that was originated from a caller device 114 may include media data (e.g., audio signal data) and signaling data. The signaling data may include, for example, call routing information, one or more identifiers (e.g., Caller ID, ANI) associated with the caller device 114, and information about the destination or callee (e.g., call center 110), among other types of information used to connect and manage the telephone call end-to-end. The identifiers associated with the caller device 114 (e.g., Caller ID, ANI) may be stored, managed, updated, and tracked in the records of a telephony database 108, which in some circumstances may be operated by a third-party service. The caller device 114, and in some cases a telecommunications carrier associated with the caller device 114 or telephone call, may append or update a data field of the signaling data containing the one or more identifiers. The analytics server 102 can use the various identifiers to query the telephony database 108 for additional data about, for example, the caller device 114 or telecommunications carrier. The telephony database 108 may store the call data for prior calls and current (or incoming) calls, which can be queried by an analytics server 102 or other devices of the system 100.

In the illustrative system 100, customer call centers 110 comprise customer servers 111, customer databases 112, call center agent devices 116, and data appliances 120. Computing devices of call centers 110, such as customer servers 111 or data appliances 120, may be configured to collect call data generated during phone calls between caller devices 114 and a call center 110 and forward the call data to the call analytics system 101 via one or more networks. Additionally or alternatively, call data collected at a call center 110 may be stored into a customer database 112 or customer server 111 and transmitted to the call analytics system 101 or perform various analytics processes. It should be appreciated that customer servers 111, customer databases 112, agent devices 116, and data appliances 120 may each include or be hosted on any number of computing devices comprising a processor and software and capable of performing various processes described herein.

A customer server 111 of a customer call center system 110 may perform certain processes for capturing call data associated with calls made to the customer call center 110, and forwarding the call data to the analytics system 101 via one or more networks. In some cases, the customer server 111 may forward the call data according to preconfigured triggering conditions or in response to receiving an incoming phone call. In some cases, the customer server 111 may forward the call data to the analytics system 101 in response to instructions or queries received from another device of the system 100, such as an agent device 116, analytics server 102, or admin device 103. In some embodiments, the customer server 111 may host and execute software processes and services for managing a call queue and/or routing calls made to the call center system 110, which may include routing calls to an appropriate call center agent. The customer server 111 may provide information about the call, caller, and/or calling device 114 to an agent device 116 of the call center agent, where certain information may be displayed to the call center agent via a GUI of the agent device 116.

A data appliance 120 of the call center system 110 may collect call data generated from phone calls between calling devices 114 and the call center 110. In some instances, call data collected at the call centers 110 is stored into a customer database 112 and/or transmitted to a customer server 111 and/or analytics server 102 to perform various analytics services.

An agent device 116 of the customer call center system 110 may allow agents or other users of the call center system 110 to configure operations of devices of the call center system 110. For calls made to the call center system 110, the agent device 116 may receive some or all of the call data associated with calls from a customer server 111 or customer database 112. The agent device 116 may likewise store call data into a customer database 112 and/or display to the agent via a GUI. In some implementations, the agent device 116 may be used to label call data as being associated with fraudulent calls or non-fraudulent calls, and store such labeled call data into a customer database 112 or forward the labeled call data to the analytics system 101.

A customer database 112 of the customer call center system 110 may store call data received from a customer server 111, data appliance 120, or agent device 116. The customer database 112 may likewise transmit call data to the customer server 111, agent device 116, or analytics system 101 in response to instructions or queries, or pre-configured triggering conditions (e.g., receiving new call data, predetermined time interval).

B. Illustrative Probability Data for Anti-Fraud or Call Verification

Probability data may be any data structure or set of values that a server (or any other computing device) can use to calculate risk scores for telephone calls or, in some cases, individual signaling data fields. The probability data is typically generated by a server using call records for prior or current calls, where the call data can be queried or otherwise received from one or more data sources. Non-limiting examples of probability data may include probability lookup tables, feature vectors, or trained machine-learning models, among other forms of data.

FIGS. 2A-2B show illustrative probability tables generated by a server using carrier metadata and derived metadata. A server generates probability tables by correlating carrier metadata with corresponding derived metadata and calculating a probability indicator, such as a distribution percentage, based on the values in the carrier metadata and the corresponding derived metadata. In the illustrative probability tables 201, 204, the columns are made up of all possible values of the carrier metadata in the dataset (e.g., originating switch, trunk, JIP). The rows are made up of all possible values derived from the Caller ID for the call. The value in each cell represents the percentage of production data which had that combination of carrier metadata value and derived metadata (e.g., carrier, location).

FIG. 2A shows an illustrative Table 201 based on correlating a carrier metadata field containing an originating switch (switch field 202) against a derived metadata field containing a geographic location (state field 203). A geographic location can often be identified or otherwise identified based upon the switch field 202 and/or other types of carrier metadata. The call data for a particular call might include a type of (carrier) metadata whose value indicates which switch originated the call, and a type of (derived) metadata whose value indicates a geographic location associated with the call. Correlating a switch field 202 against a U.S. state field 203 across records for thousands or millions of calls can yield a reliable distribution percentage indicating which metadata values have occurred and should be expected and unexpected. For example, Table 201 shows that for prior calls that arrived through Switch No. 1 (according to a value in the switch field 202 of carrier metadata), 70% of those calls had a New York phone number and 30% had a New Jersey phone number (according to corresponding values of U.S. state field 203 of derived metadata). The distribution percentage (e.g., 70%, 30%) can be referenced as a probability indicator for analyzing an incoming, current call. In operation, the server may retrieve or otherwise query the Table 201 to determine the percentage (which may represent a probability score or probability indicator) that the value of the switch field 202 (observed in the signaling data of the current call) has previously occurred or is expected to occur in conjunction with the value of the state field 203 (derived using the Caller ID of the current call). The probability indicator determined using the Table 201 can be used by the server to generate an overall risk score for the current call.

FIG. 2B shows another illustrative probability lookup table, Table 205, which correlates a JIP field 206 of carrier metadata with a carrier field 207 of derived metadata. Table 205 indicates the percentage distribution that values of the JIP field 206 have occurred in conjunction with values of the carrier field 207. The server may retrieve or otherwise query the Table 205 to determine the percentage (which may represent a probability score or probability indicator) that the value of the JIP field 206 (observed in the signaling data of the current call) has previously occurred or is expected to occur in conjunction with the value of the carrier field 207 (derived using the Caller ID of the current call). For example, the Table 205 shows that for prior calls containing JIP 404-555, 80% of the calls arrived from phone numbers registered to Carrier A, and 20% of the calls arrived from phone numbers registered to Carrier B. The probability indicator, determined using the Table 205, can be used by the server to generate an overall risk score for the current call.

The server may reference any number of probability lookup tables when determining a risk score for a call. In some cases, there may be multiple tables associated with carrier metadata fields or derived metadata fields. In such cases, the server may attempt to reference each lookup table for which the server possesses the relevant values. Tables are made for any number of possible pairs of carrier metadata and derived metadata, which sometimes includes purported information capable of being spoofed. There may be stronger correlations, and more useful information in some tables. When a call is made into a call center or any other datacenter, the server retrieves or otherwise determines the probabilities from one or more probability tables.

Figure 3:
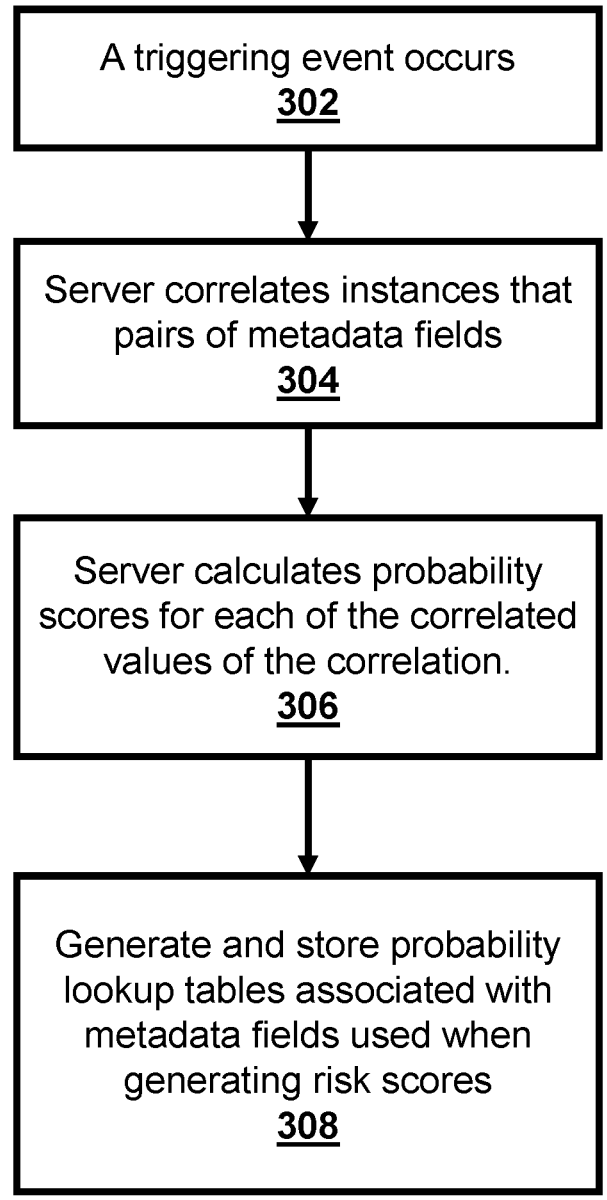
FIG. 3 shows execution steps of an illustrative method for generating or updating probability data in the form of probability lookup tables according to an embodiment.

FIG. 3 shows execution steps of an illustrative method 300 for generating or updating probability data in the form of probability lookup tables (e.g., illustrative tables 201, 205 shown in FIGS. 2A and 2B). It should be appreciated that in some embodiments may include additional, fewer, or different operations depending on the particular arrangement. In some embodiments, some or all operations of the illustrative method 300 may be performed by one or more processors executing on one or more computing devices, systems, or servers. In some embodiments, method 300 may be performed by one or more analytic servers (e.g., analytics server 102 in FIG. 1). But in some embodiments, method 300 may be performed by one or more other computing devices. Each operation may be re-ordered, added, removed, or repeated.

In a first step 302, a triggering event occurs instructing a server to generate or update a probability lookup table for one or more derived metadata fields. The server queries one or more databases storing call records to retrieve and analyze the call data for a large volume of telephone calls, which may include thousands or millions of telephone calls.

In some embodiments, certain metadata fields, such as derived metadata fields, may be received or fetched from a database of a third-party service. In some cases, such metadata may be queried and pre-stored or cached prior to executing the illustrative method 300. And in some cases, such metadata may be queried when the triggering event occurs. The third-party database may be queried according to the Caller ID or ANI associated with each call.

In a next step 304, the server correlates instances that pairs of metadata fields are observed across the call records. In the illustrative method 300, carrier metadata fields received with telephone calls are correlated with derived metadata fields that are generated, inferred, or otherwise derived from one or more fields of the carrier metadata. The server may perform such pair-wise correlations for each metadata field to be later implemented when generating risk scores.

In a next step 306, the server calculates probability scores for each of the correlated values of the correlation. In the illustrative method 300, the probability score may be based upon the probability distribution that the values of each correlated metadata field have been observed in the call data records. Additionally or alternatively, probability scores may be based upon any number of algorithmic valuations or adjusted weights. The probability scores indicate the likelihood or probability that values of the carrier metadata and derived metadata have occurred together and are expected to occur for a given phone call.

In a next step 308, the server generates and stores probability lookup tables associated with the types of carrier and/or derived metadata. The server later references these lookup tables when generating risk scores. A probability lookup table comprises, for example, the correlated types of carrier and derived metadata, the possible reference values of the correlated types of metadata, and the probability scores as generated from correlating the values of the metadata. Each of the probability lookup tables may be stored into a database accessible to the server for later retrieval when generating a risk score.

Figure 4:
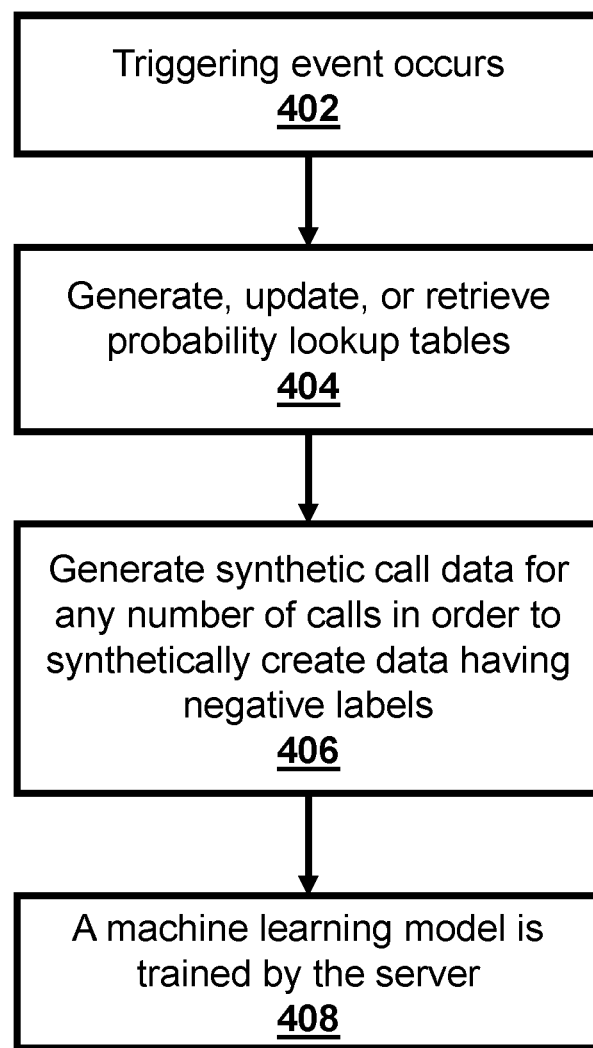
FIG. 4 shows execution steps of an illustrative method for generating probability data implementing machine learning algorithms according to an embodiment.

FIG. 4 shows execution steps of an illustrative method 400 for generating probability data implementing machine learning techniques. It should be appreciated that in some embodiments may include additional, fewer, or different operations depending on the particular arrangement. In some embodiments, some or all operations of the illustrative method 400 may be performed by one or more processors executing on one or more computing devices, systems, or servers. In some embodiments, method 400 may be performed by one or more analytic servers (e.g., analytics server 102 in FIG. 1). But in some embodiments, method 400 may be performed by one or more other computing devices. Each operation may be re-ordered, added, removed, or repeated.

Anti-fraud or call verification processes may use machine learning instead of, or in addition to, probability tables as described above in FIGS. 2A and 2B. A machine-learning model may provide more flexibility using a variety of likelihood features to accurately estimate that a call is spoofed. In some implementations, the probability values of probability lookup tables can be used as features employed for a machine learning model. Although the illustrative method 400 implements probability lookup tables-thereby implementing both probability lookup tables and machine-learning models—it should be appreciated that other embodiments may train or deploy machine-learning models without using probability lookup tables.

In a first step 402, a triggering event occurs, a triggering event occurs instructing a server to generate or update a probability lookup table for one or more derived metadata fields. The server queries one or more databases storing call records to retrieve and analyze the call data for a large volume of telephone calls, which may include thousands or millions of telephone calls.

In some embodiments, certain metadata fields, such as derived metadata fields, may be received or fetched from a database of a third-party service. In some cases, such metadata may be queried and pre-stored or cached prior to executing the illustrative method 400. And in some cases, such metadata may be queried when the triggering event occurs. The third-party database may be queried according to the Caller ID or ANI associated with each call.

In a next step 404, the server generates, updates, or retrieves probability lookup tables. These probability lookup tables may be generated or updated based on, for example, pair-wise correlations of metadata fields. An example of generating or updating probability lookup tables may be found in FIG. 3. The server may query, request, or otherwise receive one or more probability lookup tables from a database or other storage medium.

In a next step 406, the server generates synthetic call data for any number of synthetic calls in order to synthetically or simulate create call data having negative labels. Across a large enough population of calls, it can be assumed that nearly all of the calls are valid and have valid call data. Consequently, it can be difficult to train a reliable machine-learning model using almost entirely positive examples, where the labelled training dataset is almost entirely positive labels. It can also be difficult to identify fraudulent calls from thousands or millions of calls and generate negative labels for the dataset. The server generates synthetic call data to produce data having negative labels for training. The server selects a predetermined or random set of carrier metadata that cannot be spoofed and then generate duplicate data that "pretends" a calling device is "lying" about a random ANI, then the server may match the carrier metadata according to false pairings. The resulting synthetic data is assigned a negative label and fed into the machine-learning algorithm.

In a call center, when production data is captured, it will contain a very small percentage of spoofed calls relative to the legitimate calls, such that the server can assume all calls are legitimate for the purpose of training a machine learning model. For the negative labels (e.g., real examples of spoofed calls), actual spoofed calls can be manually identified or generated in a testing environment while being tracked and labeled accordingly. This, however, may be tedious and time-consuming; and it may be impossible to sufficiently spoof calls implementing large enough variety of methods and techniques to be effective. Generating synthetic positive labels may address these problems.

As an example, the server may select data records for two calls at random from a production dataset and pair the carrier metadata from a first call ("Call 1"), with the derived Caller ID information from a second call ("Call 2"). The server generates synthetic call data using the mixed metadata values from Call 1 and Call 2. In this example, the resulting synthetic call data simulates a spoof service located near the caller who is attempting to defraud the callee. Later, when training the machine-learning model the server performs one or more table lookups for this synthetically mixed dataset of data, and a resulting feature vector for a synthetically generated call data as an example of a possible fraudulent or spoofed call having a negative label. In this way, by pulling random pairs of calls from the production dataset in a records database, the server may generate any number of synthetically spoofed calls having negative labels.

In a next step 408, a machine-learning model is trained by the server executing one or more machine-learning algorithms or processes (e.g., Support Vector Machine (SVM), random forest). In some embodiments, training a machine-learning model may result in the machine-learning algorithm providing a weighting on the positive labels (e.g., associating a stronger weighting on each individual probability table). In some embodiments, the machine-learning model that combines weighted probability outputs from each of the probability lookup tables and combine the outputs into a single score.

A machine-learning model may be global, applicable for all Caller IDs or ANIs, or the machine-learning model may be tailored to particular customer call centers or tailored to calling devices (e.g., Caller IDs, ANIs). For instance, machine-learning models may be generated using all call data records available to the server; or the machine-learning models may be generated using only call data records received from a particular call center.

C. Illustrative Fraud Risk Scoring for Anti-Fraud or Call Verification

Figure 5:
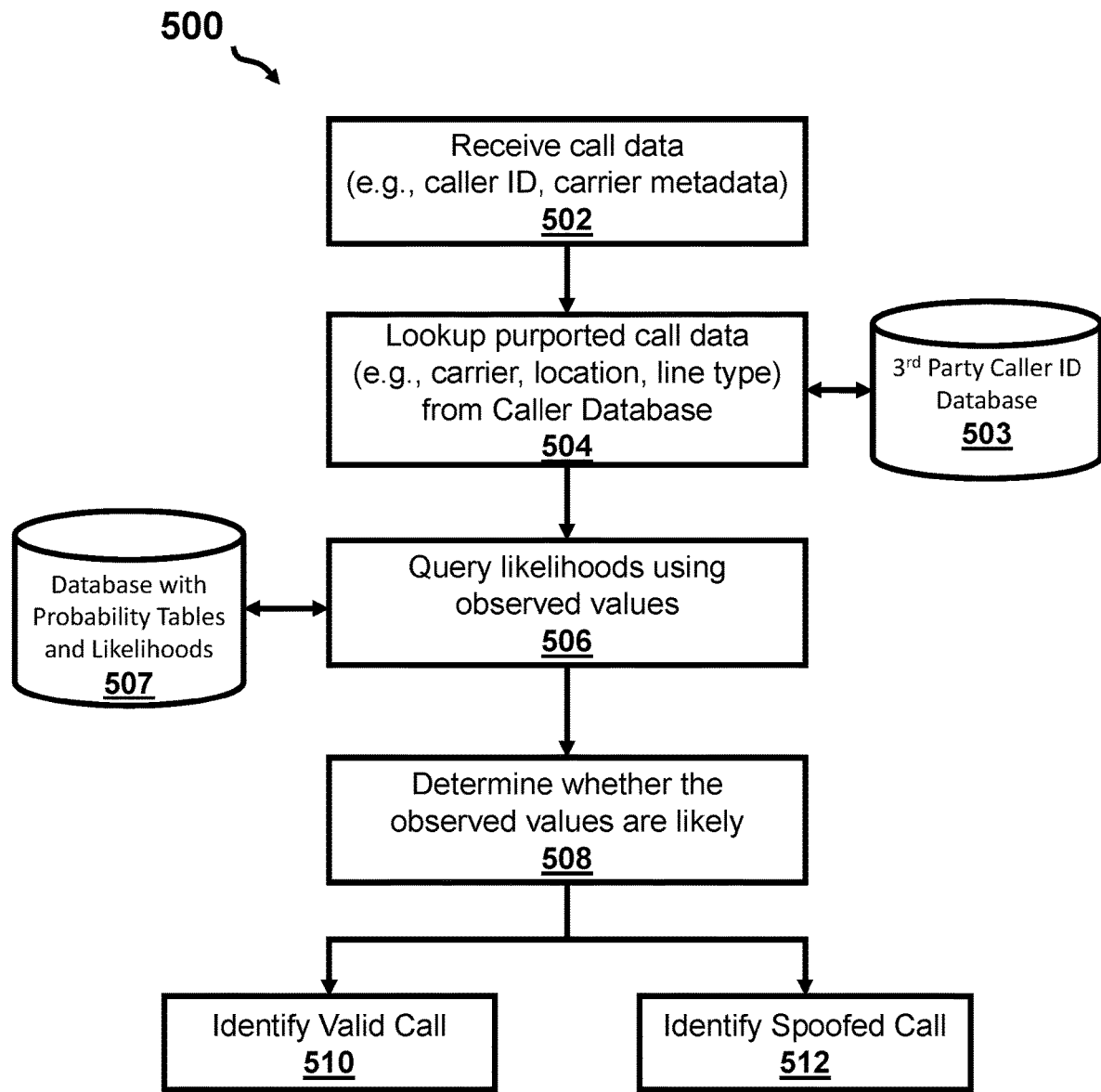
FIG. 5 shows execution steps of an illustrative method for determining fraud risk and detecting fraudulent or spoofed calls according to an embodiment.

FIG. 5 shows execution steps of an illustrative method 500 for detecting spoofed calls. In the illustrative method 500, server or other computing device uses computer-generated probability tables (sometime referred to as "lookup tables") that are based on various forms of call metadata. It should be appreciated that in some embodiments may include additional, fewer, or different operations depending on the particular arrangement. In some embodiments, some or all operations of the illustrative method 500 may be performed by one or more processors executing on one or more computing devices, systems, or servers. In some embodiments, method 500 may be performed by one or more analytic servers (e.g., analytics server 102 in FIG. 1). But in some embodiments, method 500 may be performed by one or more other computing devices. Each operation may be re-ordered, added, removed, or repeated.

Lookup tables are generated to indicate the probability that certain metadata observed in carrier metadata or derived from the carrier metadata should occur when certain carrier metadata is received with an incoming, current call. In the illustrative method 500, the server executes a spoof detection algorithm comparing, for example, purported call data, which may include a caller identification (Caller ID) value and additionally or alternatively certain associated derived metadata against carrier metadata, to determine the probability that the observed carrier metadata and derived metadata values should occur according to one or more probability tables.

In the illustrative method 500, a server or other computer device queries a Caller ID database 503 (sometimes referred to herein as a "telephony database") for certain carrier and/or derived metadata based on the purported Caller ID received with an incoming call. The server then queries a probability database 507 for one or more lookup tables that indicate a probability (e.g., percentage distribution of observed values, pre-defined score) that the values of carrier metadata and derived metadata are expected to occur.

In a first step 502, the server receives call data (e.g., Caller ID, carrier metadata) for an incoming call. The server may be triggered to execute a call risk analysis process in response to receive the call data and an indication that the lifecycle of the telephone call has begun. Alternatively, the server may begin the fraud risk analysis at a given point in the call lifecycle, such as a caller's attempt to access private information, or in response to an instruction received from a user computing device.

In an optional next step 504, the server may query a Caller ID database 503 using the purported Caller ID of the call data, or other carrier metadata (e.g., carrier, location, line type). The Caller ID database 503 may be operated and managed by a third-party, and referenced by the server for validation or supplementation of the metadata received with the current call or derived from said metadata. It should be appreciate that, in some instances, the server may sometimes skip the current step 504. For example, the server may have sufficient information or confidence regarding the Caller ID or ANI for the current, incoming call.

In step 506, the server queries the probability database 507 using the observed metadata values (of the carrier metadata; received from the Caller ID database 503) to determine the probability scores for one or more metadata fields. Using carrier metadata fields or derived metadata fields, the server may request or otherwise query the probability lookup tables for the particular metadata fields of interest. Based on the probability lookup tables, the server may determine the probability values associated with the types of carrier metadata and derived metadata of interest.

In step 508, the server determines whether the values of the carrier metadata and derived metadata are expected to occur in the call (represented as a risk score), based upon a risk threshold. In some implementations, the server may generate the risk score according to an algorithm that combines each of the probability scores determined for each of the metadata fields. For example, the risk score may be the result of an average, weighted average, sum, or weighted sum of the probability scores, though any number of additional or alternative algorithmic operations may be employed as well. The risk score may then be compared against a threshold value (e.g., verification threshold, risk threshold). In an optional step 510, the server may identify the call as a valid call based on the results of evaluating the call in the prior step 508. Alternatively, in optional step 512, the server may identify the call as a spoofed call or otherwise not valid, based on the results of evaluating the call in the prior step 508.

Figure 6:
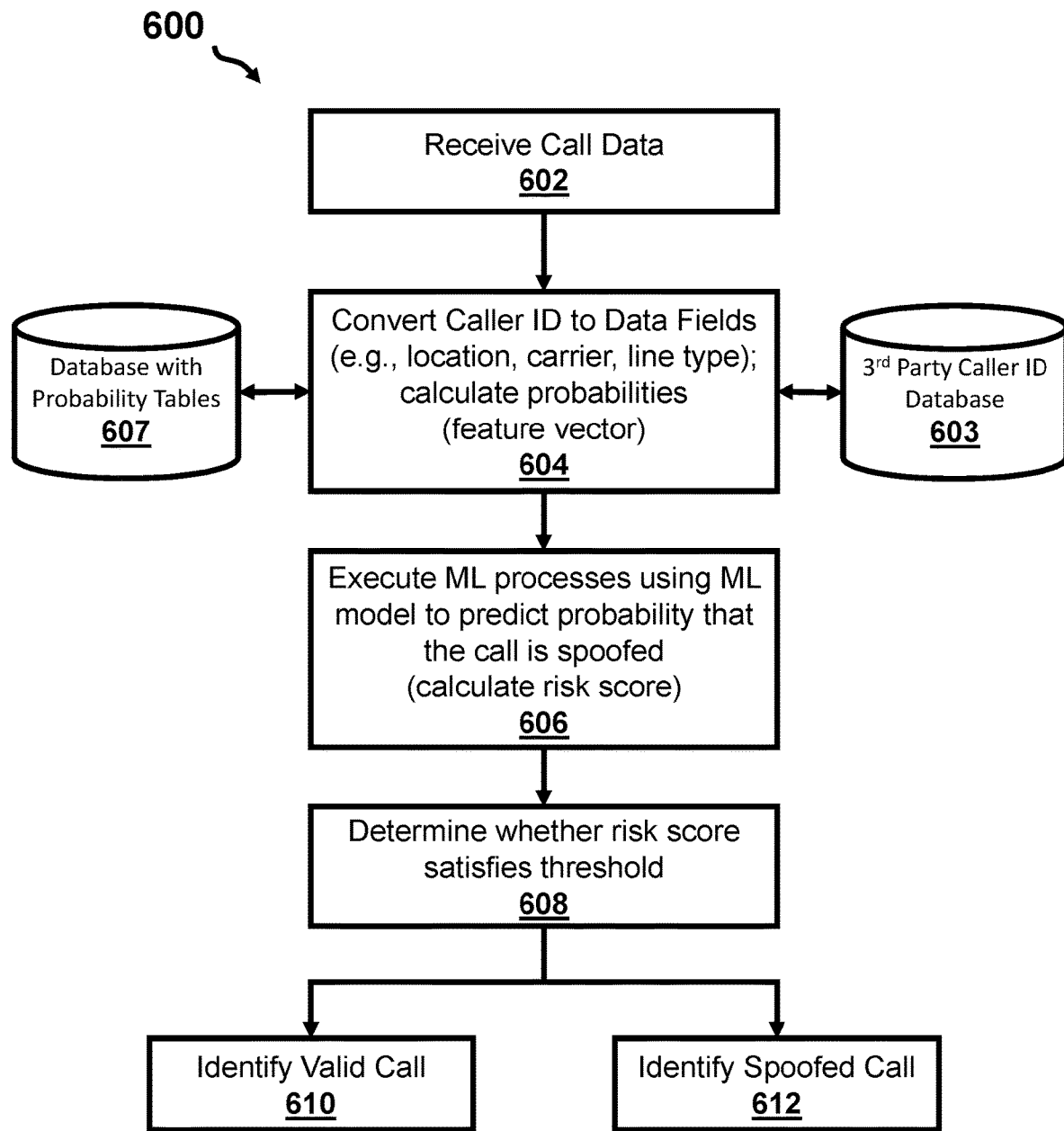
FIG. 6 shows execution steps of an illustrative method for determining fraud risk and detecting fraudulent or spoofed calls using machine-learning processes and probability tables according to an embodiment.

FIG. 6 shows execution steps of an illustrative method 600 for spoof detection by applying machine-learning processes on probability tables. It should be appreciated that in some embodiments may include additional, fewer, or different operations depending on the particular arrangement. In some embodiments, some or all operations of the illustrative method 600 may be performed by one or more processors executing on one or more computing devices, systems, or servers. In some embodiments, method 600 may be performed by one or more analytic servers (e.g., analytics server 102 in FIG. 1). But in some embodiments, method 600 may be performed by one or more other computing devices. Each operation may be re-ordered, added, removed, or repeated.

In a first step 602, a server receives call data (e.g., Caller ID, carrier metadata) for an incoming call. The server may be triggered to execute a call risk analysis process in response to receive the call data and an indication that the lifecycle of the telephone call has begun. Alternatively, the server may begin the fraud risk analysis at a given point in the call lifecycle, such as a caller's attempt to access private information, or in response to an instruction received from a user computing device.

In a next step 604, the server converts a caller identifier (Caller ID) to certain carrier metadata (e.g., location, carrier, line type) and/or derived metadata by querying a Caller ID database 603 and/or one or more additional or alternative databases (e.g., call records database) accessible to the server. In some cases, the server may query a Caller ID database 603 using the purported Caller ID of the call data, or other carrier metadata (e.g., carrier, location, line type). The Caller ID database 603 may be operated and managed by a third-party, and referenced by the server for validation or supplementation of metadata received with the current call or derived from said metadata. The server may also query a probability database 607 for probability data comprising probability tables, a trained machine-learning model for generating a risk score based upon the metadata for the current incoming call, and any other data or weights used for determining the probability scores and the risk score.

The server may calculate the probability scores for the types of carrier metadata and derived metadata of interest, based upon the values observed or generated, in the carrier metadata or the derived metadata. The server may use the relevant probability tables, and any optional weighted values associated with the types of metadata, to calculate the probability scores for the metadata. In some implementations, these probability scores may be algorithmically combined into one or more feature vectors, which may be associated with calling devices (e.g., Caller IDs, ANIs) and labels that indicate whether such feature vectors correspond to fraudulent calls or non-fraudulent calls. One or more machine-learning models may be applied to the feature vectors to train the machine-learning models, according to a machine-learning algorithm implemented by the server. A trained machine-learning model is stored as a form of probability data into the probability database 607, and later applied to a feature vector or other data associated with an inbound call.

In step 606, the server uses a machine-learning model to predict the probability (represented as a risk score) that the call is spoofed or otherwise fraudulent. Additionally or alternatively, the machine-learning model may predict the probability (represented as the risk score) that the call originated from a verified or expected calling device (e.g., Caller ID, ANI). The server may execute a machine-learning algorithm that applies the trained machine-learning model on the feature vector calculated for the current phone call. Applying the machine-learning model may be accomplished according to the particular machine-learning algorithm used, such as a random forest, SVM, or similar machine-learning algorithms. The output of the machine-learning model may be the risk score for the current phone call, as calculated based upon the feature vector of the current call and, for example, weights assigned to each value of the feature vector according to the machine-learning model.

In step 608, the server determines whether the risk score, as calculated from applying the machine-learning model, satisfies a predetermined fraud threshold. In step 610, when the server determines the risk score satisfies the threshold, then the server determines that the server has identified the current is a valid call. Alternatively, in step 612, when server determines the risk score fails to satisfy the threshold, then the server determines that the server has identified the current call is a spoofed call.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    obtaining, by a computer, call data for a current call originated at a calling device, the call data including one or more carrier metadata values of one or more types of carrier metadata values and one or more derived metadata values of one or more types of derived metadata values;
    generating, by the computer, a first score for the current call based upon comparing a portion of the call data for the current call against prior call data of one or more prior calls stored in one or more databases;
    obtaining, by the computer, a call-data pair using the call data of the current call, the call-data pair includes a carrier metadata value of a type of carrier metadata value correlated to a derived metadata value of a type of derived metadata value;
    generating, by the computer, a second score for the current call based upon probability data indicating a probability of occurrence of the call-data pair; and
    generating, by the computer, a third score for the current call based upon the first score generated using the prior call data of the one or more prior calls and the second score generated using the probability data.

2. The method according to claim 1, wherein the prior call data of the one or more prior calls includes a stored fraud likelihood score for the carrier metadata value in the call data, and wherein the computer generates the first score according to the stored fraud likelihood score for the carrier metadata value.

3. The method according to claim 1, wherein the prior call data of the one or more prior calls includes prior carrier metadata value in the prior call data, and wherein the computer generates the first score based upon comparing the prior carrier metadata value against the carrier metadata value of the call data of the current call.

4. The method according to claim 1, wherein generating the third score includes adjusting, by the computer, the first score in accordance with the second score to generate the third score.

5. The method according to claim 1, further comprising verifying, by the computer, the calling device in response to determining that the third score satisfies a verification threshold that the carrier metadata for the current call is associated with a verified calling device.

6. The method according to claim 1, further comprising detecting, by the computer, the current call as fraudulent in response to determining that the third score satisfies a fraud risk threshold.

7. The method according to claim 1, wherein the probability data used for the second score includes a probability table for the type of carrier metadata value correlated to the type of derived metadata value of the call-data pair, the probability table indicating the probability of occurrence of the carrier metadata value and the derived metadata value of the call-data pair.

8. The method according to claim 1, wherein the probability data used for the second score includes a machine-learning architecture trained to generate the second score indicating the probability of occurrence of the call-data pair.

9. The method according to claim 1, wherein the computer obtains a plurality of call-data pairs using the call data of the current call, wherein the computer generates a plurality of second scores corresponding to the plurality of call-data pairs, and wherein the computer generates the third score using the first score and the plurality of second scores.

10. The method according to claim 1, wherein at least one carrier metadata value indicates at least one of: Jurisdiction Information Parameter (JIP), Originating Line Information (OLI), P-Asserted-Identity, an originating switch, an originating trunk, or Caller ID.

11. The method according to claim 1, wherein at least one derived metadata value indicates at least one of: a carrier, a geographic location, or a line type.

12. A system comprising:
a server comprising a processor configured to:
obtain call data for a current call originated at a calling device, the call data including one or more carrier metadata values of one or more types of carrier metadata values and one or more derived metadata values of one or more types of derived metadata values;
generate a first score for the current call based upon comparing a portion of the call data for the current call against prior call data of one or more prior calls stored in one or more databases;
obtain a call-data pair using the call data of the current call, the call-data pair includes a carrier metadata value of a type of carrier metadata value correlated to a derived metadata value of a type of derived metadata value;
generate a second score for the current call based upon probability data indicating a probability of occurrence of the call-data pair; and
generate a third score for the current call based upon the first score generated using the prior call data of the one or more prior calls and the second score generated using the probability data.

13. The system according to claim 12, wherein the prior call data of the one or more prior calls includes a stored fraud likelihood score for the carrier metadata value in the call data, and wherein the computer generates the first score according to the stored fraud likelihood score for the carrier metadata value.

14. The system according to claim 12, wherein the prior call data of the one or more prior calls includes prior carrier metadata value in the prior call data, and wherein the computer generates the first score based upon comparing the prior carrier metadata value against the carrier metadata value of the call data of the current call.

15. The system according to claim 12, wherein, when generating the third score, the computer is configured to adjust the first score in accordance with the second score to generate the third score.

16. The system according to claim 12, wherein the computer is configured to verify the calling device in response to the computer determining that the third score satisfies a verification threshold that the carrier metadata for the current call is associated with a verified calling device.

17. The method according to claim 12, wherein the computer is configured to detect the current call as fraudulent in response to determining that the third score satisfies a fraud risk threshold.

18. The system according to claim 12, wherein the probability data used for the second score includes a probability table for the type of carrier metadata value correlated to the type of derived metadata value of the call-data pair, the probability table indicating the probability of occurrence of the carrier metadata value and the derived metadata value of the call-data pair.

19. The system according to claim 12, wherein the probability data used for the second score includes a machine-learning architecture trained to generate the second score indicating the probability of occurrence of the call-data pair.

20. The system according to claim 12, wherein the computer obtains a plurality of call-data pairs using the call data of the current call, wherein the computer generates a plurality of second scores corresponding to the plurality of call-data pairs, and wherein the computer generates the third score using the first score and the plurality of second scores.

\* \* \* \* \*